(12) United States Patent
Shaaban et al.

(10) Patent No.: US 11,906,990 B2
(45) Date of Patent: Feb. 20, 2024

(54) WATER LEVEL DETECTION VIA PRESSURE SENSING DEVICE

(71) Applicant: Kohler Co., Kohler, WI (US)

(72) Inventors: Nameer Shaaban, Kohler, WI (US); Jason M. Kwacz, Kohler, WI (US)

(73) Assignee: KOHLER CO., Kohler, WI (US)

( * ) Notice: Subject to any disclaimer, the term of this patent is extended or adjusted under 35 U.S.C. 154(b) by 8 days.

(21) Appl. No.: 17/498,095

(22) Filed: Oct. 11, 2021

(65) Prior Publication Data

US 2022/0026935 A1 Jan. 27, 2022

Related U.S. Application Data

(62) Division of application No. 16/507,324, filed on Jul. 10, 2019, now Pat. No. 11,169,548.

(60) Provisional application No. 62/702,952, filed on Jul. 25, 2018.

(51) Int. Cl.
| | |
|---|---|
| *G05D 9/12* | (2006.01) |
| *G05D 23/19* | (2006.01) |
| *G01K 13/00* | (2021.01) |
| *G01F 23/18* | (2006.01) |

(52) U.S. Cl.
CPC ............... *G05D 9/12* (2013.01); *G01F 23/18* (2013.01); *G01K 13/00* (2013.01); *G05D 23/19* (2013.01)

(58) Field of Classification Search
CPC ......... Y10T 137/7303; Y10T 137/7306; Y10T 137/7313; Y10T 137/7498; G05D 9/12; G05D 23/19; E03C 1/24; E03C 1/242; E03C 1/055; E03C 1/057; G01F 23/18
See application file for complete search history.

(56) References Cited

U.S. PATENT DOCUMENTS

| | | | |
|---|---|---|---|
| 1,704,510 A | 3/1929 | Muend | |
| 1,737,804 A | 12/1929 | Reedy | |
| 1,781,325 A | 11/1930 | Dowling | |
| 1,821,584 A | 9/1931 | Schultis | |
| 1,943,628 A | 1/1934 | Schultis | |
| 3,064,094 A ‡ | 11/1962 | Marchi, V | ............ D06F 39/087 200/83 WM |
| 3,156,931 A | 11/1964 | Holtman | |

(Continued)

FOREIGN PATENT DOCUMENTS

| | | |
|---|---|---|
| CN | 102230320 A ‡ | 11/2011 |
| CN | 202173317 U | 3/2012 |

(Continued)

OTHER PUBLICATIONS

Machine English translation of DE3925590A1 (Year: 2021).*

(Continued)

*Primary Examiner* — Hailey K. Do
(74) *Attorney, Agent, or Firm* — FOLEY & LARDNER LLP

(57) ABSTRACT

A water level detection system includes a water containing vessel, an airtight tube fluidly coupled to the water containing vessel, a pressure sensor fluidly coupled to the airtight tube, and a water level control unit communicably coupled to the pressure sensor. The water level control unit is configured to control at least one of a height of water within the water containing vessel or a temperature of the water based on pressure data from the pressure sensor.

16 Claims, 4 Drawing Sheets

(56) References Cited

U.S. PATENT DOCUMENTS

| | | | |
|---|---|---|---|
| 3,159,849 A | | 12/1964 | Jacuzzi |
| 3,591,872 A | | 7/1971 | Vanegas et al. |
| 3,860,977 A | | 1/1975 | Politz |
| 4,468,938 A | ‡ | 9/1984 | McMillan ............... D06F 23/04 68/23.3 |
| 4,700,884 A | ‡ | 10/1987 | Barrett ..................... E03B 7/04 126/362.1 |
| 4,852,054 A | | 7/1989 | Mastandrea |
| 4,930,164 A | | 6/1990 | Gibson |
| 5,079,784 A | ‡ | 1/1992 | Rist ..................... A61H 33/005 250/231.19 |
| 5,207,251 A | ‡ | 5/1993 | Cooks ..................... G01F 23/16 137/240 |
| 5,210,886 A | | 5/1993 | Coe, III |
| 5,333,498 A | * | 8/1994 | Brackett ................ G01F 23/18 73/304 R |
| 6,058,525 A | | 5/2000 | Paden |
| 6,142,017 A | | 11/2000 | Glassey |
| 6,473,917 B1 | ‡ | 11/2002 | Mateina .................... E03C 1/05 236/12.12 |
| 6,497,143 B1 | * | 12/2002 | Rinkewich ................ G01F 1/52 137/409 |
| 6,732,388 B2 | | 5/2004 | McKenna |
| 6,895,610 B2 | | 5/2005 | Olson |
| 7,007,319 B2 | | 3/2006 | Dunnett et al. |
| 7,076,814 B2 | ‡ | 7/2006 | Ostrowski ............ D06F 39/088 4/541.1 |
| 7,451,502 B2 | | 11/2008 | Ball |
| 7,631,522 B2 | ‡ | 12/2009 | Bindocci ................ D06F 34/18 68/12.27 |
| 7,658,104 B2 | ‡ | 2/2010 | Hewitt .................... G01F 25/20 73/299 |
| 7,913,331 B2 | | 3/2011 | Hartman |
| 8,505,139 B2 | ‡ | 8/2013 | Vanhazebrouck ...... D06F 39/08 68/3 R |
| 9,096,966 B2 | ‡ | 8/2015 | Kaltofen ............. A47L 15/4246 |
| 9,816,258 B2 | | 11/2017 | Marotz et al. |
| 10,760,250 B2 | | 9/2020 | Ewers |
| 11,064,844 B2 | | 7/2021 | Braddock et al. |
| 11,085,178 B1 | | 8/2021 | Oliver |
| 11,169,548 B2 | | 11/2021 | Shaaban et al. |
| 2005/0028295 A1 | ‡ | 2/2005 | Jeon ........................ D06F 33/46 8/158 |
| 2008/0047060 A1 | | 2/2008 | Ball |
| 2008/0163416 A1 | ‡ | 7/2008 | Go ........................... E03C 1/055 700/65 |
| 2009/0050209 A1 | ‡ | 2/2009 | Rautavuori ............. E03C 1/057 137/624.11 |
| 2009/0178192 A1 | ‡ | 7/2009 | Vassilev ............... G05D 23/1393 4/668 |
| 2013/0175350 A1 | * | 7/2013 | Marks ..................... E03B 7/045 236/12.12 |
| 2014/0174547 A1 | ‡ | 6/2014 | Joo ......................... D06F 34/28 137/2 |
| 2014/0359935 A1 | | 12/2014 | Veros et al. |
| 2015/0122337 A1 | | 5/2015 | Manavoglu et al. |
| 2015/0227145 A1 | * | 8/2015 | Reddy ...................... G05D 9/12 137/391 |
| 2015/0240464 A1 | | 8/2015 | Meyers |
| 2016/0177554 A1 | | 6/2016 | Yu |
| 2016/0186418 A1 | | 6/2016 | Yu |
| 2017/0342629 A1 | * | 11/2017 | Gwon ..................... D06F 37/20 |
| 2018/0310775 A1 | | 11/2018 | Degraye et al. |
| 2019/0331252 A1 | | 10/2019 | Jensen et al. |
| 2020/0033898 A1 | ‡ | 1/2020 | Shaaban ................ G01K 13/00 |

FOREIGN PATENT DOCUMENTS

| | | | |
|---|---|---|---|
| CN | 206037430 U | | 3/2017 |
| CN | 106802176 A | ‡ | 6/2017 |
| DE | 39 25 590 A1 | | 2/1991 |
| DE | 3925590 A1 | ‡ | 2/1991 ......... G05D 23/1393 |
| EP | 0 174 53 A1 | | 3/1980 |
| EP | 2 918 739 A1 | | 9/2015 |
| FR | 2704882 | | 11/1994 |
| FR | 2704882 A1 | ‡ | 11/1994 ............... E03C 1/05 |

OTHER PUBLICATIONS

First Chinese Office Action for CN Appl. Ser. No. 201910654352.1 dated Aug. 17, 2020 (18 pages) (English Translation).‡
Extended European Search Report on EP Appl. No. 20213487.0 dated May 20, 2021 (10 pages).
Second Office Action on CN Patent No. 201910654352.1 dated Jun. 3, 2021 (18 pages).
First Chinese Office Action on CN Appl. Ser. No. 202011470989.4 dated Mar. 29, 2022 (20 pages).
Second Chinese Office Action issued in connection with CN Appl. Ser. No. 202011470989.4 dated Sep. 28, 2022 (10 pages).

\* cited by examiner
‡ imported from a related application

WATER LEVEL DETECTION VIA PRESSURE SENSING DEVICE

CROSS-REFERENCE TO RELATED PATENT APPLICATIONS

This application is a divisional of U.S. patent application Ser. No. 16/507,324, filed Jul. 10, 2019, which claims the benefit of and priority to U.S. Provisional Application No. 62/702,952, filed Jul. 25, 2018, both of which are hereby incorporated by reference in their entireties.

BACKGROUND

The present application relates generally to the field of water level detection systems. More specifically, this application relates to continuous water level detection of bath tubs or water containing vessels utilizing a pressure sensing device.

SUMMARY

At least one embodiment of this application relates to a water level detection system. The water level detection system includes a water containing vessel, an airtight tube, a pressure sensor, and a water level control unit. The water containing vessel includes a drain and is configured to receive a volume of water. The airtight tube is fluidly coupled to the water containing vessel. The pressure sensor is fluidly coupled to the airtight tube. The water level control unit is communicably coupled to the pressure sensor. The water level control unit is configured to control at least one of a height of the water within the water containing vessel or a temperature of the water based on pressure data from the pressure sensor.

Another embodiment relates to a water level detection system. The water level detection system includes a bathtub, an airtight tube, a pressure sensor, and a water level control unit. The bathtub includes a lower wall, a forward wall, a rear wall, and a pair of side walls. Each of the forward wall, the rear wall, and the side walls extend upwardly from the lower wall to define an interior volume. The airtight tube is fluidly coupled to the bathtub. The pressure sensor is fluidly coupled to the airtight tube. The water level control unit is communicably coupled to the pressure sensor. The water level control unit is configured to control at least one of a height of the water within the bathtub or a temperature of the water based on pressure data from the pressure sensor.

Yet another embodiment relates to a method. The method includes receiving, by a controller, a first pressure of air from a pressure sensor. The pressure sensor is fluidly coupled to an airtight tube, which is fluidly coupled to a water containing vessel. The water containing vessel is configured to receive a volume of water. The method additionally includes receiving, by the controller, a second pressure of air from the pressure sensor. The method further includes controlling, by the controller, at least one of a height of the water within the water containing vessel or a temperature of the water within the water containing vessel based on the first pressure of air and the second pressure of air.

DETAILED DESCRIPTION

Prior to turning to the figures, which illustrate the exemplary embodiment in detail, it should be understood that the present disclosure is not limited to the details or methodology set forth in the description or illustrated in the figures. It should also be understood that the terminology used herein is for the purpose of description only and should not be regarded as limiting.

Water level detection sensors may be utilized in a wide array of applications, such as in washing machines, pools, hot tubs, or bathtubs to, for example, provide overflow protection. With regard to a bathtub application specifically, the most prevalent means of detecting a water level is by using capacitive water detection sensors. However, such sensors generally are only operable with plastic tubs, as they can usually only detect through up to a 4 mm wall thickness. In addition, these sensors generally operate by mounting such sensors to the shell of the tub, and the sensor may be configured to simply detect whether water is present or absent from the corresponding height at which the sensor is mounted. Another means of a water level detection sensor is an ultrasonic distance sensor. These sensors are a more costly solution, and operate by being mounted above the tub, and measuring the distance to the surface of the water. However, any obstruction between the sensor and the surface of the water would likely yield inaccurate results. Consequently, a water level detection sensor which can be utilized on bathtubs or other water containing vessels made of a variety of different materials would be beneficial (e.g., cast iron, cast resin, thermoformed plastic, FRP reinforced, Exocyclic, etc.). In addition, a sensor which can accurately detect a water level continuously would be beneficial.

Figure 1:
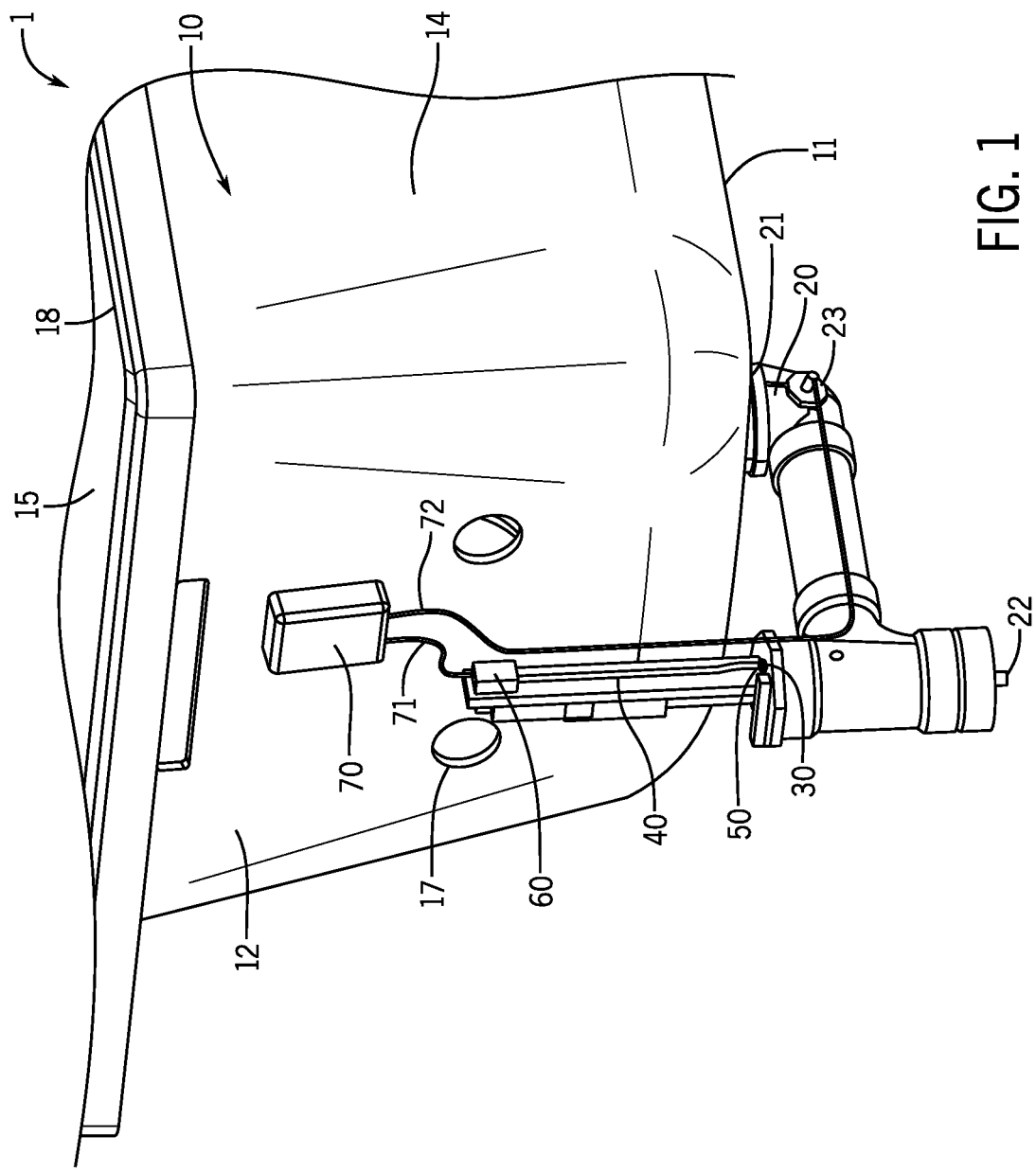
FIG. 1 is a partial perspective view of a water level detection system, according to an exemplary embodiment.
Figure 2:
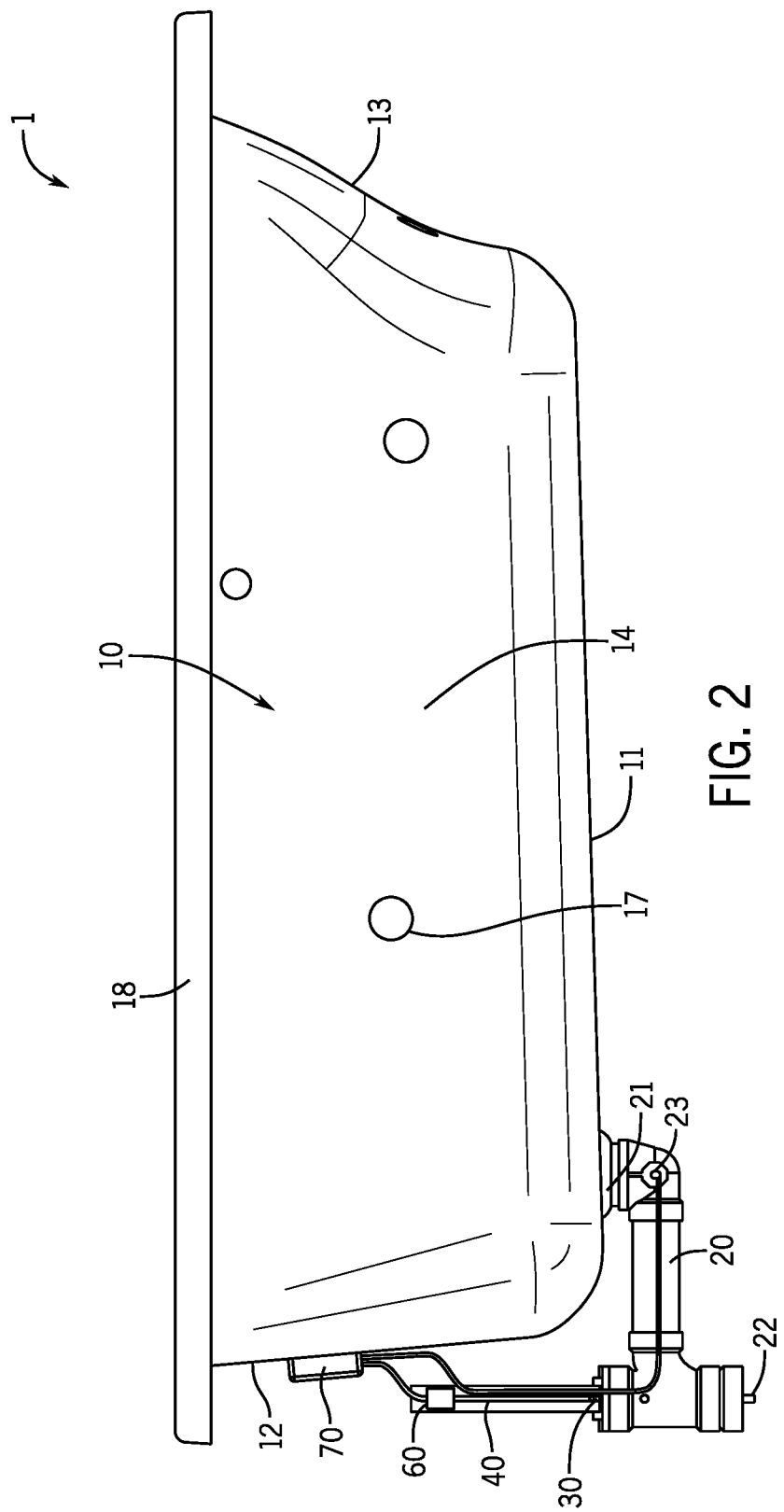
FIG. 2 is a side view of the water level detection system of FIG. 1.

Referring generally to the Figures, disclosed herein is a water level detection system 1 that uses a sensor, such as a pressure sensor, pressure transducer, or transmitter, to continuously detect the water level within a bathtub or other water containing vessel (e.g., a vessel configured to receive a volume of water), so as to enable dynamic control of water temperature and water level to, for example, provide overflow protection and user personalization. The water level detection system 1 is configured to control at least one of a height of the water in the water containing vessel or a temperature of the water in the water containing vessel based on pressure data from the pressure sensor. The water level detection system 1 of FIGS. 1-2 is shown to include a bathtub 10 having a drain conduit 20. The drain conduit 20 includes a connection for a tube, an airtight tube 40, at least one pressure sensor, and a processing circuit (e.g., controller, etc.). The bathtub 10 is configured to receive a volume of water, and is shown to include a lower wall 11 having a drain hole 21 which fluidly couples an interior 15 of the bathtub 10 to the drain conduit 20. The drain conduit 20 is configured to allow water to be removed from the interior 15 of the bathtub 10. The bathtub 10 also includes an upright extending forward wall 12, a rear wall 13 (as shown in FIG. 2), a pair of generally upright extending side walls 14, and an upper rim 18, which together define the interior volume for the bathtub 10. As shown in FIG. 2, each of the forward wall 12, the rear wall 13, and the side walls 14 extend upwardly from the lower wall 11 in a substantially perpendicular orientation relative to the lower wall 11. The bathtub 10 may also include a faucet (not shown) disposed above the upper rim 18 of the bathtub 10, which is configured to provide water to the interior 15 of the bathtub 10.

The drain conduit 20 may be fluidly coupled to the airtight tube 40 by way of a connector 30. The connector 30 may be a nipple or other connecting mechanism that couples the airtight tube 40 to an outer surface (i.e., shell) of the bathtub 10 proximate to the drain hole 21 of the bathtub 10. Or, alternatively, as shown in FIGS. 1-2, the connector 30 may connect the drain conduit 20 to the airtight tube 40 along a drain pipe that is spaced apart from the drain hole 21 of the bathtub 10. The airtight tube 40 is shown to extend in an upright direction along the outer surface of the forward wall 12 of the bathtub 10. The airtight tube 40 may be in fluid communication with the pressure sensor 60 (e.g., transducer, transmitter, etc.), which is shown to be coupled along the outer surface of the forward wall 12 of the bathtub 10 above the airtight tube 40. According to another exemplary embodiment, the pressure sensor may be located remotely from the bathtub 10 and the connector 30, and may be fluidly coupled to a different portion of the drain conduit 20, such as position 23 near the drain hole 21. By locating the pressure sensor 60 away from the point of applied water to the bathtub 10 (e.g., near a faucet, etc.), water temperature and water hammer effects on the sensor can be reduced or eliminated, thereby providing for more accurate water level detection and control. An orifice plate 50 (e.g., pressure gauge snubber) may be disposed between, and in fluid communication with, the pressure sensor 60 and the connector 30 of the drain conduit 20, along the airtight tube 40.

Figure 4:
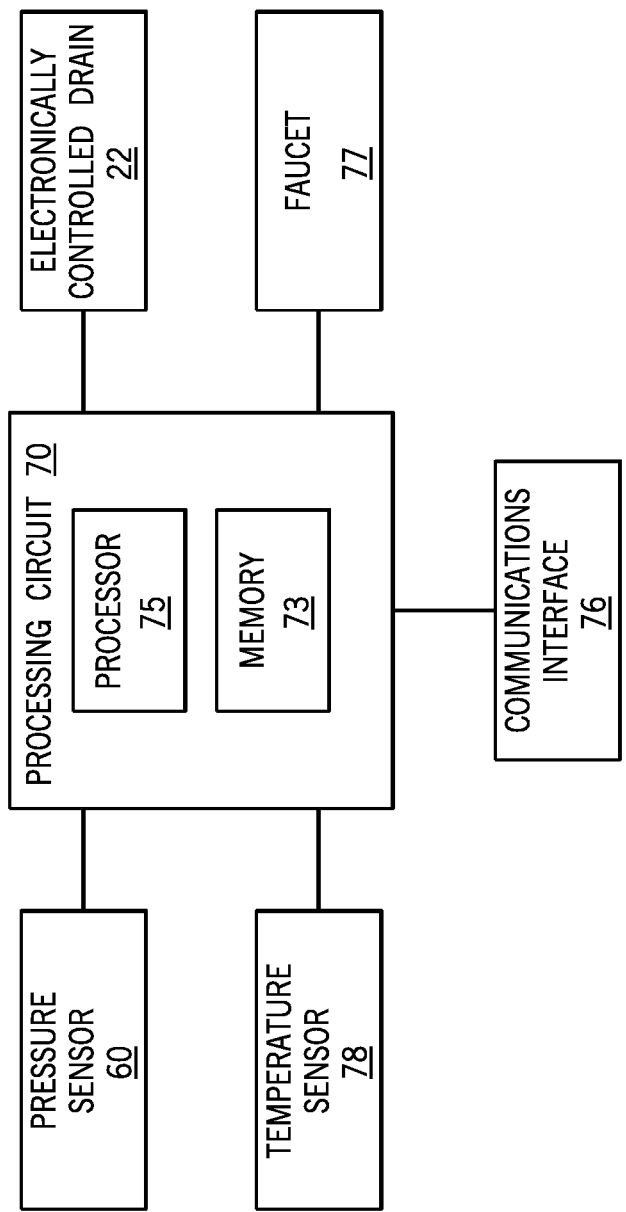
FIG. 4 is a schematic diagram of a controller of the water level detection system of FIG. 1, according to an exemplary embodiment.

Referring to FIGS. 1-2 and 4, the water level detection system 1 also includes a water level control unit (e.g., a water level control circuit, a controller, etc.), shown as processing circuit 70. The processing circuit 70 is shown to be communicatively coupled to the pressure sensor 60 by way of wire 71. The processing circuit 70 may be configured to receive pressure data (e.g., values of measured pressure over time, etc.) indicative of an air pressure within the airtight tube 40. For example, the pressure sensor 60 can indicate perceived pressure measurements of air within the airtight tube 40 (e.g., a pressure exerted against the pressure sensor 60 by the air within the airtight tube 40) to the processing circuit 70, and the processing circuit 70 may store predetermined and calculated pressure values within memory 73 of the processing circuit. The water level detection system 1 can also include an electronically controlled drain 22 (e.g., plunger, drain valve, etc.) located downstream of the airtight tube 40. As shown in FIG. 4, the electronically controlled drain 22 is operably (and communicatively) coupled to the processing circuit 70, such that processor 75 may be configured to send signals to the electronically controlled drain 22 to open or close the drain, thereby controlling the water level within the bathtub 10. In this way, the processing circuit 70 may be configured to control the electronically controlled drain 22 to allow water to exit the interior 15 of the bathtub 10, or to stop the draining of water from the interior 15 of the bathtub 10.

The bathtub 10 of FIG. 1 is also shown to include openings 17 for jets. Jets may be disposed within each opening 17, and may be configured to operatively inject air into the interior 15 of the bathtub 10 when water is present, such that bubble or a massaging effect may be provided to a user. In some embodiments, the connector 30 may connect the airtight tube 40 through the openings 17 for the jets, rather than being connected to the drain conduit 20. It should be appreciated that the operation of the water level detection system 1 would operate in substantially the same manner as described below whether the airtight tube 40 is connected directly to the drain conduit 20, to the openings 17 for the jets, or at some other location of the bathtub 10.

Figure 3:
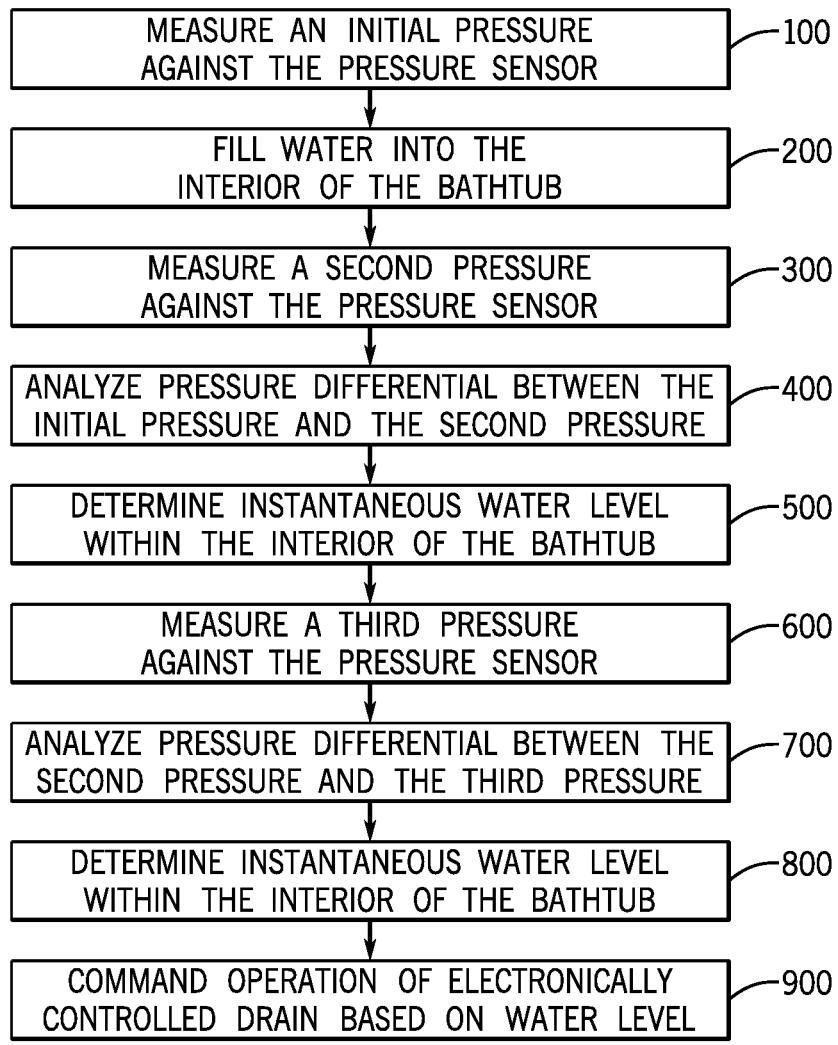
FIG. 3 is a schematic diagram of the operation of the water level detection system of FIG. 1, according to an exemplary embodiment.

Referring now to FIG. 3, the operation of the water level detection will be described generally. In operation, before water is filled into the interior 15 of the bathtub 10, air may be present within the airtight tube 40 that connects the drain conduit 20 to the pressure sensor 60. At Step 100, the pressure sensor 60 may measure the perceived pressure of the air within the airtight tube 40 using the pressure sensor 60, and may communicate the initial pressure measurement (e.g., pressure data, a first pressure, etc.) to the processing circuit 70. The processing circuit 70 may store the measurement as a baseline in memory 73 (i.e., the initial pressure measurement, or pressure measurement when no water is present within the interior 15 of the bathtub 10). The memory 73 may have predetermined values for the weight of water, the volume of the interior 15 of the bathtub 10 and the dimensions of the bathtub 10, such that the height of water contained within the interior 15 of the bathtub 10 could be determined by the processor 75. At Step 200, water may begin to be filled into the interior 15 of the bathtub 10 by the faucet. Air that is within the airtight tube 40 is compressed by the weight of the water that is within the interior 15 of the bathtub 10. At Step 300, the pressure sensor 60 may communicate the perceived pressure exerted against the pressure sensor 60 from the air within the airtight tube 40 to the processing circuit 70 (i.e., measure a second pressure exerted against the pressure sensor 60). At Step 400, the pressure differential of the compressed air against the pressure sensor 60 as compared to when the bathtub 10 was empty may be sent to the processor 75 and analyzed. The processor 75 may compare the initial pressure measurement to the second pressure measurement stored in memory 73, and may analyze the pressure differential by factoring in various predetermined parameters such as the volume of the bathtub 10, the dimensions of the bathtub 10, and the weight of the water corresponding to different water levels within the bathtub 10. At Step 500, the instantaneous height of the water in the interior 15 of the bathtub 10 may be determined. In this manner, the instantaneous height of the water can be used to enable dynamic control of the water level to, for example, provide overflow protection and user personalization.

The water level detection system 1 can intermittently or continuously monitor and analyze the height or volume of water within the interior 15 of the bathtub 10. Specifically, Steps 600-800 may be repeated as the water level within the bathtub 10 is maintained or adjusted (i.e., water is filled or drained from the interior 15 of the bathtub 10) to provide the instantaneous water level. At Step 600, as the water level has adjusted (or, alternatively, is maintained) within the interior 15 of the bathtub 10, a third pressure that is exerted against the pressure sensor 60 by the air within the airtight tube 40 may be measured. At Step 700, the pressure differential between the second pressure measurement and the third pressure measurement may be analyzed. At Step 800, based on the pressure differential and the predetermined values (i.e., weight of the water, dimensions of the bathtub 10, and volume of the interior 15 of the bathtub 10), the water level detection system 1 can determine the instantaneous height of the water within the interior 15 of the bathtub 10.

In some embodiments, such as for the water level detection system 1 shown in FIGS. 1-2, when an electronically controlled drain 22 (e.g., drain valve) is present, the processing circuit 70 may control the operation of the electronically controlled drain 22 and/or the faucet (which may also be operably coupled to the processing circuit 70) to adjust the instantaneous height of the water level to, for example, provide overflow protection or user personalization. Specifically, at Step 900, based on the instantaneous water level within the interior 15 of the bathtub 10 determined at Step 800, the processor 75 may send a signal via the wire 72 to the electronically controlled drain 22 to open or close, such that water may be retained within or drained out of the interior 15 of the bathtub 10. For example, the processing circuit 70 may contain a predetermined desired water level threshold, and, if it is determined that the instantaneous water level within the interior 15 of the bathtub 10 exceeds the predetermined desired water level threshold (e.g., if a user entered the bathtub 10, causing the water to displace around the user's body, thus causing the instantaneous water level to increase due to the increased volume within the interior 15 of the bathtub 10), the processor 75 may control the electronically controlled drain 22 to open to allow water to drain from the interior 15 of the bathtub 10. Once the instantaneous water level returns to the desired water level, the processor 75 can operate the electronically controlled drain 22 to close, thus maintaining the instantaneous water level to be approximately equal to the predetermined desired water level threshold.

In addition, in some embodiments (as shown in FIG. 4), by utilizing an Internet of Things (IoT) application via a communications interface 76 (e.g., using a smart phone, tablet, computer, etc.), it is envisioned that the processing circuit 70 of the water level detection system 1 can be used to direct a faucet 77 of the bathtub to fill the bathtub 10 with a certain amount of water, and upon the pressure sensor 60 communicating to the processing circuit 70 that the amount of water has been filled, the processor 75 can be configured to turn off the faucet of the bathtub 10. The water level detection system 1 can be configured to prevent overflowing of the bathtub 10, such that, upon the water level reaching a predetermined water level threshold (e.g., just below the height of the upper rim 18 of the bathtub 10), the processor 75 can be configured to turn off the faucet 77 automatically.

Similarly, in some embodiments (as shown in FIG. 4), the water level detection system 1 may additionally include a temperature sensor 78 that may be communicably coupled to (e.g., configured to communicate with) processing circuit 70 of the water level detection system 1 (see also FIGS. 1-2) and configured to transmit temperature data to the processing circuit 70. As shown in FIG. 4, the processing circuit 70 of the water level detection system 1 has a single processor (e.g., processor 75, etc.) that is configured to control the opening and closing of the drain 22, the operation of the faucet, and the temperature of the water being filled into the bathtub 10. Alternatively, the processing circuit 70 of the water level detection system 1 may have multiple processors that are configured to communicate with one another and an application (e.g., a software application), where the processors are configured to each control at least one of the opening and closing of the drain 22, the operation of the faucet, and the temperature of the water being filled into the bathtub 10 (e.g., a single operation or a combination of operations). For example, a user may provide an input into a software application of a desired temperature of the water (e.g., a predefined water temperature) within the bathtub 10, and the processor of the water level detection system 1 may be configured to control the amount and temperature of water being filled into the bathtub 10 to achieve the desired water temperature. By way of another example, if the bathtub 10 contains a volume of water that is at a cooler temperature than the desired temperature by the user, the processor may open the drain 22 to allow a certain volume of cooler water to drain from the bathtub 10, and then refill the bathtub 10 with warmer water via the faucet such that the volume of water remaining in the bathtub 10 will be at the desired temperature indicated by the user.

Further, in some embodiments, the user may specify within the software application that the water temperature and water level be maintained at a desired value. The processing circuit 70 of the water level detection system 1 may be configured to open the drain 22, by continuously monitoring the water level and/or water temperature, to allow a certain amount of water to drain from the bathtub 10 and replace the water with a certain amount of warmer water to maintain the desired water level and temperature.

In some embodiments, the water level detection system 1 can be configured to operate as a safety mechanism. For example, the water level detection system 1 may be configured to communicate with a software application via the communications interface 76 when a certain volume of water is detected within the bathtub 10. For example, the processing circuit 70 may be configured such that when a large instantaneous change in pressure occurs (e.g., if a child were to jump into the bathtub 10), the processing circuit 70 may send an alert to a software application on a user's electronic device (e.g., smartphone, tablet, etc.) via the communications interface 76.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, processor, microprocessor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory 73 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory 73 may be or include volatile memory or non-volatile memory, and may include database components, object code components, script components, or any other type of information structure for supporting the various activities and information structures described in the present disclosure. According to an exemplary embodiment, the memory 73 is communicably connected to the processor 75 via a processing circuit 70 and includes computer code for executing (e.g., by the processing circuit 70 or the processor 75) the one or more processes described herein.

Advantageously, because the water level is not required to be detected through the shell of the bathtub 10 (see FIGS. 1-2), the water level detection system 1 may be utilized on shells made of any material. In addition, because the pressure sensing calculations may be performed based on the instantaneous pressure of the water as determined by the change in pressure within the airtight tube 40, the device provides for accuracy up to at least +/−0.5" of the actual water level, as opposed to currently known methods, which deviate from the actual water level by at least +/−1.0". Though the water level detection system 1 is described in terms of bathtub usage, it may also be implemented for other water containing vessels (e.g., sinks, basins, toilets, etc.).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled to each other, with the two members coupled with a separate intervening member and any additional intermediate members coupled with one another, or with the two members coupled together with an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the continuous water level detection system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the position of elements may be reversed or otherwise varied, and the nature or number of discrete elements or positions may be altered or varied. Any element disclosed in one embodiment may be incorporated or utilized with any other embodiment disclosed herein.

Other substitutions, modifications, changes and omissions may also be made in the design, operating conditions and arrangement of the various exemplary embodiments without departing from the scope of the present invention. For example, the order or sequence of any process or method steps may be varied or re-sequenced according to alternative embodiments.

What is claimed is:

1. A water level detection system, comprising:
   a bathtub comprising a lower wall, a forward wall, a rear wall, and a pair of side walls, each of the forward wall, the rear wall, and the pair of side walls extending upwardly from the lower wall to define an interior volume, the bathtub further comprising a drain disposed in the lower wall and a drain conduit fluidly coupled to the drain;
   an airtight tube fluidly coupled to the drain conduit downstream from the drain and extending upwardly from the lower wall;
   a connector fluidly coupling the airtight tube to the drain conduit, the airtight tube disposed at a first axial end of the connector and a drain discharge disposed at a second axial end of the connector opposite the first axial end;
   a drain valve coupled to the drain conduit downstream of the airtight tube;
   a pressure sensor fluidly coupled to the airtight tube; and
   a water level control unit communicably coupled to the pressure sensor, the water level control unit configured to control at least one of a height of the water within the bathtub or a temperature of the water based on pressure data from the pressure sensor.

2. The water level detection system of claim 1, wherein the water level control unit is configured to determine the height of the water based on predetermined values of at least one of a volume of an interior of the bathtub, dimensions of the bathtub, or a weight of water corresponding to different water levels within the bathtub.

3. The water level detection system of claim 1, wherein the drain valve is operably coupled to the water level control unit and configured to drain the water from the bathtub, wherein the water level control unit is configured to control the drain valve to maintain the height of the water in the bathtub to be approximately equal to a predetermined water level threshold.

4. The water level detection system of claim 1, further comprising a faucet operably coupled to the water level control unit and configured to provide water to the bathtub, wherein the water level control unit is configured to control the faucet to maintain the height of the water within the bathtub to be approximately equal to a predetermined water level threshold.

5. The water level detection system of claim 1, further comprising a faucet and a temperature sensor, wherein the faucet and the temperature sensor are operably coupled to the water level control unit, wherein the faucet is configured to provide water to the bathtub, wherein the temperature sensor is configured to determine the temperature of the water, and wherein the water level control unit is configured to control the faucet to maintain the temperature of the water within the bathtub to be approximately equal to a predefined water temperature.

6. The water level detection system of claim 1, wherein the airtight tube extends in an upright direction that is oriented substantially perpendicular to the lower wall.

7. The water level detection system of claim 1, further comprising an orifice plate disposed along the airtight tube.

8. The water level detection system of claim 1, wherein the drain valve is coupled to the second axial end of the connector.

9. The water level detection system of claim 8, wherein the airtight tube extends away from the drain conduit in a first direction, wherein the drain valve extends away from the drain conduit in a second direction that is opposite the first direction.

10. A water level detection system, comprising:
a bathtub comprising a lower wall, a forward wall, a rear wall, and a pair of side walls, each of the forward wall, the rear wall, and the pair of side walls extending upwardly from the lower wall to define an interior volume, the bathtub further comprising a drain disposed in the lower wall and a drain conduit fluidly coupled to the drain;
an airtight tube fluidly coupled to the drain conduit downstream from the drain and extending upwardly from the lower wall;
a drain valve coupled to the drain conduit downstream of the airtight tube;
a pressure sensor fluidly coupled to the airtight tube at a distal end of the airtight tube;
an orifice plate disposed at a proximal end of the airtight tube; and
a water level control unit communicably coupled to the pressure sensor, the water level control unit configured to control at least one of a height of the water within the bathtub or a temperature of the water based on pressure data from the pressure sensor.

11. A method, comprising:
receiving, by a controller, a first pressure of air from a pressure sensor that is fluidly coupled to an airtight tube, the airtight tube fluidly coupled to a drain conduit by a connector, the airtight tube disposed at a first axial end of the connector and a drain discharge disposed at a second axial end of the connector opposite from the first axial end, the drain conduit fluidly coupled to a drain disposed in a lower wall of a water containing vessel, the airtight tube coupled to the drain conduit upstream of a drain valve, the airtight tube extending upwardly from the drain of the water containing vessel, the water containing vessel configured to receive a volume of water;
receiving, by the controller, a second pressure of air from the pressure sensor; and
controlling, by the controller, at least one of a height of the water in the water containing vessel or a temperature of the water in the water containing vessel based on the first pressure of air and the second pressure of air.

12. The method of claim 11, further comprising determining, by the controller, a first height of the water by comparing the second pressure of air with the first pressure of air.

13. The method of claim 11, further comprising controlling, by the controller, a faucet based on the second pressure of air to maintain the height of the water in the water containing vessel to be approximately equal to a predetermined water level threshold.

14. The method of claim 11, further comprising:
receiving, by the controller, temperature data from a temperature sensor, wherein the temperature sensor is configured to determine the temperature of the water within the water containing vessel; and
controlling, by the controller, a faucet based on the temperature data to maintain the temperature of the water in the water containing vessel to be approximately equal to a predefined water temperature.

15. The method of claim 11, further comprising:
receiving, by the controller, a third pressure of air from the pressure sensor; and
determining a second height of the water based on the third pressure of air and at least one of the first pressure of air or the second pressure of air.

16. The method of claim 15, further comprising controlling, by the controller, the drain valve based on at least one of the second pressure of air or the third pressure of air to maintain the height of the water in the water containing vessel to be approximately equal to a predetermined water level threshold.

* * * * *